(12) United States Patent
Verma et al.

(10) Patent No.: US 12,328,625 B2
(45) Date of Patent: *Jun. 10, 2025

(54) CONTEXT-BASED SECURITY OVER INTERFACES IN NG-RAN ENVIRONMENTS IN MOBILE NETWORKS

(71) Applicant: Palo Alto Networks, Inc., Santa Clara, CA (US)

(72) Inventors: Sachin Verma, Danville, CA (US); Leonid Burakovsky, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,280

(22) Filed: Feb. 27, 2024

(65) Prior Publication Data

US 2024/0205759 A1    Jun. 20, 2024

Related U.S. Application Data

(63) Continuation of application No. 17/681,489, filed on Feb. 25, 2022, now Pat. No. 11,950,144.

(51) Int. Cl.
*H04W 36/00* (2009.01)
*H04W 12/00* (2021.01)
(Continued)

(52) U.S. Cl.
CPC ..... *H04W 36/0038* (2013.01); *H04W 12/009* (2019.01); *H04W 12/102* (2021.01);
(Continued)

(58) Field of Classification Search
CPC . H04W 12/009; H04W 12/102; H04W 24/08; H04W 80/10; H04W 84/04
See application file for complete search history.

(56) References Cited

U.S. PATENT DOCUMENTS 10,574,670 B1 *   2/2020   Verma ................... H04W 12/72
10,984,128 B1 *   4/2021   Hoffer ................... G16B 50/30
(Continued)

FOREIGN PATENT DOCUMENTS

WO        2020060890        3/2020

OTHER PUBLICATIONS

Bharath et al., RIC: A Ran Intelligent Controller Platform for AI-Enabled Cellular Networks, Apr. 16, 2021, IEEE Computer Society Internet Computing. Best Available Date, Mar. 11, 2021.
(Continued)

*Primary Examiner* — San Htun
(74) *Attorney, Agent, or Firm* — Van Pelt, Yi & James LLP

(57) ABSTRACT

Techniques for applying context-based security over interfaces in NG-RAN environments in mobile networks are disclosed. In some embodiments, a system/process/computer program product for applying context-based security over interfaces in NG-RAN environments in mobile networks includes monitoring network traffic on a mobile network at a security platform to identify a GTP-U tunnel session setup message associated with a new session; extracting a plurality of parameters from the GTP-U tunnel session setup message and from XnAP traffic to extract contextual information at the security platform; and enforcing a security policy at the security platform on the new session based on one or more of the plurality of parameters to apply context-based security to the network traffic transported between NG-RAN nodes in an NG-RAN environment in the mobile network.

15 Claims, 12 Drawing Sheets

(51) Int. Cl.
  *H04W 12/102* (2021.01)
  *H04W 12/60* (2021.01)
  *H04W 24/08* (2009.01)
  *H04W 80/10* (2009.01)
  *H04W 80/12* (2009.01)
  *H04W 84/04* (2009.01)
  *H04W 88/16* (2009.01)

(52) U.S. Cl.
  CPC ........... *H04W 12/60* (2021.01); *H04W 24/08* (2013.01); *H04W 80/10* (2013.01); *H04W 80/12* (2013.01); *H04W 84/04* (2013.01); *H04W 88/16* (2013.01)

(56) References Cited

U.S. PATENT DOCUMENTS

| | | | |
|---|---|---|---|
| 11,304,092 | B2 | 4/2022 | Park |
| 11,650,851 | B2 | 5/2023 | Palermo |
| 2018/0367571 | A1* | 12/2018 | Verma ................. H04L 63/0263 |
| 2019/0075023 | A1 | 3/2019 | Sirotkin |
| 2019/0182211 | A1* | 6/2019 | Yang ..................... H04L 69/326 |
| 2019/0253386 | A1 | 8/2019 | Verma |
| 2019/0274185 | A1 | 9/2019 | Stojanovski |
| 2020/0145432 | A1 | 5/2020 | Verma |
| 2020/0196101 | A1* | 6/2020 | Edge ..................... H04W 12/06 |
| 2020/0260506 | A1 | 8/2020 | Benson |
| 2021/0127386 | A1* | 4/2021 | Edge ...................... H04W 4/02 |
| 2021/0144517 | A1 | 5/2021 | Guim Bernat |
| 2021/0329456 | A1 | 10/2021 | Preda |
| 2021/0377876 | A1 | 12/2021 | Jeon |
| 2021/0410107 | A1 | 12/2021 | Park |
| 2022/0015071 | A1 | 1/2022 | Hui |
| 2022/0030521 | A1 | 1/2022 | Cirik |
| 2022/0070943 | A1 | 3/2022 | Xu |
| 2022/0078728 | A1 | 3/2022 | Yi |
| 2022/0116908 | A1 | 4/2022 | Chun |
| 2022/0166838 | A1 | 5/2022 | Ma |
| 2022/0201716 | A1 | 6/2022 | Yi |
| 2022/0369404 | A1 | 11/2022 | Gundavelli |
| 2023/0127658 | A1 | 4/2023 | Li |
| 2023/0363031 | A1 | 11/2023 | Gundavelli |
| 2023/0389125 | A1 | 11/2023 | Islam |

OTHER PUBLICATIONS

ETSI, TS 123 003 V16.3.0 (Oct. 2020), Digital Cellular Telecommunications System (Phase 2+) (GSM); Universal Mobile Telecommunications System (UMTS); LTE; 5G; Numbering, Addressing and Identification (3GPP TS 23.003 version 16.3.0 Release 16).

ETSI, TS 138 423 V16.6.0 (Aug. 2021), 5G; NG-RAN; Xn Application Protocol (XnAP), (3GPP TS 38.423 Version 16.6.0 Release 16).

ETSI, TS 138 470 V16.5.0 (Aug. 2021), 5G; NG-RAN; F1 General Aspects and Principles (3GPP TS 38.470 Version 16.5.0 Release 16).

ETSI, TS 138 473 V16.6.0 (Aug. 2021), 5G; NG-RAN; F1 Application Protocol (F1AP), (3GPP TS 38.473 Version 16.6.0 Release 16).

* cited by examiner

| IE/Group Name | P | Description |
|---|---|---|
| PDU Session Resources To be Setup List | | IE Contains PDU Session Resource Related Information Used at UE Context Transfer Between NG-RAN Nodes |
| Masked IMEISV* | O | This Information Element Contains the IMEISV Value with a Mask, to Identify a Terminal Model Without Identifying an Individual Mobile Equipment. |

FIG. 2A

| IE/Group Name | P | Description |
|---|---|---|
| PDU Session Resources To Be Setup List | | |
| >>S-NSSAI | M | Indicates the S-NSSAI as Defined in TS 23.003 |
| >>UL NG-U UP TNL Information at UPF | M | UPF Endpoint of the NG-U Transport Bearer. For Delivery of UL PDUs |
| >>Source DL NG-U TNL Information | O | Indicates the Possibility to Keep the NG-U GTP-U Tunnel Termination Point at the Target NG-RAN Node. |

FIG. 2B

| IE/Group Name | P | Description |
|---|---|---|
| S-NSSAI | M | Indicates the S-NSSAI as Defined in TS 23.003 |
| Masked IMEISV | M | This Information Element Contains the IMEISV Value with a Mask, to Identify a Terminal Model Without Identifying an Individual Mobile Equipment.<br><br>We Can Use Type Allocation Code(TAC) to Get Make and Model of 5G Device. |
| UL UP TNL | M | gNB-CU Endpoint of the F1 Transport Bearer. For Delivery of UL PDUs. |

FIG. 4A

| IE/Group Name | P | Description |
|---|---|---|
| DL UP TNL | M | gNB-DU Endpoint of the F1 Transport Bearer. For Delivery of DL PDUs. |

FIG. 4B

CONTEXT-BASED SECURITY OVER INTERFACES IN NG-RAN ENVIRONMENTS IN MOBILE NETWORKS

This application is a continuation of U.S. patent application Ser. No. 17/681,489 entitled CONTEXT-BASED SECURITY OVER INTERFACES IN NG-RAN ENVIRONMENTS IN MOBILE NETWORKS filed Feb. 25, 2022, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRA WINGS

Various embodiments of the invention are disclosed in the following detailed description and the accompanying drawings.

FIGS. 2A and 2B are tables of the parameters that are extracted by the security platform from a handover request during setup of a GTP-U tunnel session in accordance with some embodiments.

FIGS. 4A and 4B are tables of the parameters that are extracted by the security platform from a handover request during setup of a GTP-U tunnel session in accordance with some embodiments.

DETAILED DESCRIPTION

Figure 1:
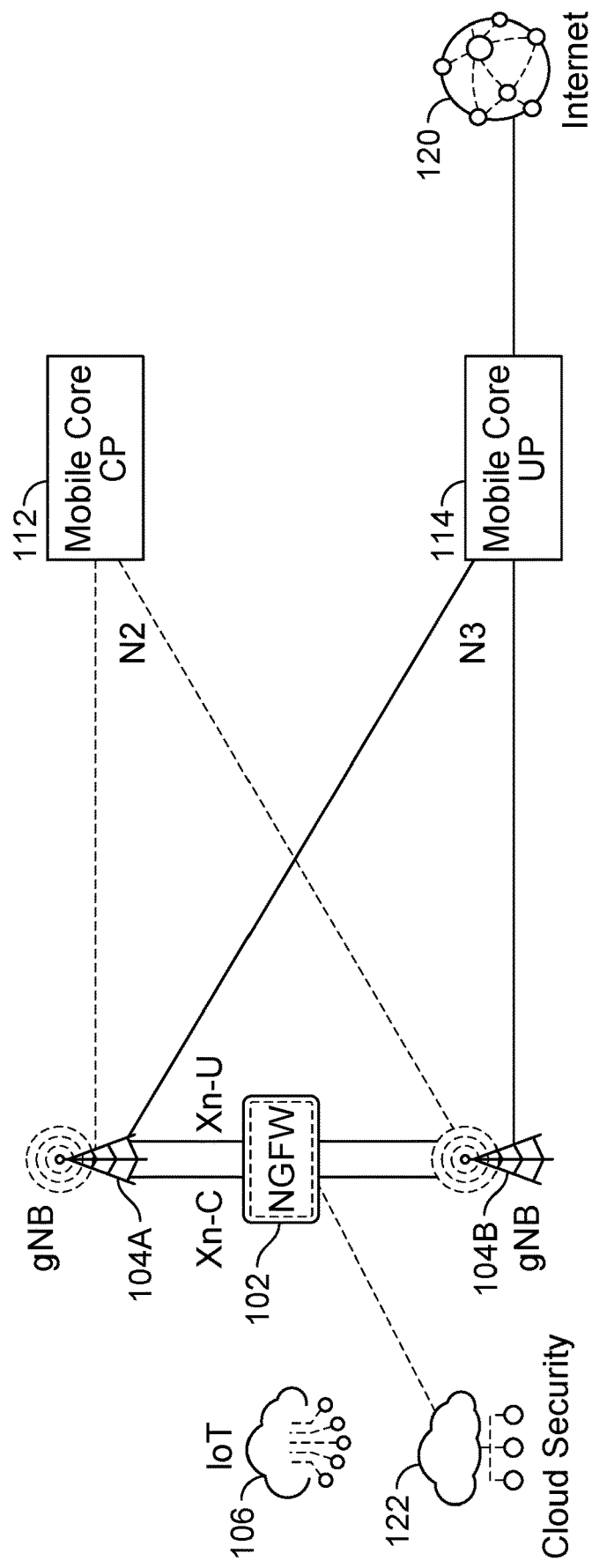
FIG. 1 is a block diagram of an architecture of a 5G wireless network with a security platform for applying context-based security over interfaces in an NG-RAN environment in mobile networks in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QOS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls).

For example, Palo Alto Networks' next generation firewalls enable enterprises and service providers to identify and control applications, users, and content—not just ports, IP addresses, and packets-using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Overview of Techniques for Applying Context-Based Security Over Interfaces in NG-RAN Environments and/or O-RAN Environments in Mobile Networks Next Generation RAN (NG-RAN) architecture is a newly defined radio access network for 5G mobile networks. However, this new radio access network is vulnerable to new threat vectors. As an example, the NG-RAN architecture in mobile networks opens up new security threats over the Xn-U interface. Self-driving cars and industrial Internet of Things (IOT) applications will generate significant traffic over Xn interfaces (e.g., including Xn-C and Xn-U interfaces). As a result, self-driving cars that are compromised/infected with malware could potentially attack or infect other cars over these interfaces or other interfaces in mobile networks (e.g., 4G, 5G, 6G, or later mobile networks).

In addition, Open Radio Access Network (O-RAN) is an evolution of the Next Generation RAN (NG-RAN) architecture. However, this new architecture similarly opens up new threat vectors. As an example, the new O-RAN architecture in, for example, 5G mobile networks opens up new security threats over the F1-U interface. Self-driving cars and industrial Internet of Things (IOT) applications will generate significant traffic over F1 interfaces (e.g., including F1-C and F1-U interfaces). As a result, self-driving cars that are compromised/infected with malware could potentially attack or infect other cars over these interfaces or other interfaces in mobile networks (e.g., 4G, 5G, 6G, or later mobile networks).

Thus, technical and security challenges with service provider networks exist for devices in mobile networks. As such, what are needed are new and improved security techniques for devices in such service provider network environments (e.g., mobile networks). Specifically, what are needed are new and improved solutions for monitoring such network traffic and applying context-based security policies (e.g., firewall policies) for devices communicating on service provider networks, including over various NG-RAN related interfaces (e.g., Xn interfaces, including Xn-C and Xn-U interfaces) in NG-RAN environments in mobile networks as well as over various O-RAN related interfaces (e.g., F1 interfaces, including F1-C and F1-U interfaces) in O-RAN environments in mobile networks.

In an example implementation, the security platform is configured to inspect XnAP traffic over an Xn-C interface between a source NG-RAN node and target NG-RAN node to extract contextual information in NG-RAN environments in mobile networks. The security platform can also inspect GTP-U traffic over an Xn-U interface between the source NG-RAN node and the target NG-RAN node to apply layer 7 security on user plane traffic. The security platform can correlate the context information with the user plane traffic to deliver the context-based security capabilities for inter node traffic in NG-RAN environments in mobile networks (e.g., 4G, 5G, 6G, or later mobile networks).

In some embodiments, the security platform is configured to provide the following DPI capabilities: stateful inspection of XnAP traffic over Xn-C interfaces; and stateful inspection of GTP-U traffic over Xn-U interfaces and to apply context-based security in NG-RAN environments in mobile networks as will be further described below.

In another example implementation, the security platform is configured to inspect F1AP traffic over an F1-C interface between O-RAN Distributed Unit (O-DU) and O-RAN Centralized Unit Control Plane (O-CU-CP) to extract contextual information in O-RAN environments in mobile networks. The security platform can also inspect GTP-U traffic over an F1-U interface between O-DU and O-RAN Centralized Unit Data Plane (O-CU-DP) to apply layer-7 security on User Plane (UP) traffic. The security platform can correlate the context information with the user plane traffic to deliver the context-based security capabilities in O-RAN environments in mobile networks (e.g., 4G, 5G, 6G, or later mobile networks).

In some embodiments, the security platform is configured to provide the following DPI capabilities: stateful inspection of F1AP traffic over F1-C interfaces between O-DU and O-CU-CP; and stateful inspection of GTP-U traffic over F1-U interfaces to extract contextual information and to apply context-based security in O-RAN environments in mobile networks as will be further described below.

As such, the disclosed techniques facilitate enhanced security for NG-RAN environments in mobile networks and also for O-RAN environments in mobile networks. For example, security functions (e.g., security platforms) can be located closer to the user/device (e.g., UE) for performing security policy analysis and enforcement. As another example, security functions can be implemented to facilitate security for selective industry verticals. As yet another example, security can be implemented in highly sensitive locations, such as government network environments, military network environments, and power plant or other key infrastructure network environments.

Accordingly, new and improved security solutions that facilitate applying security (e.g., network-based security) using a security platform (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) in a mobile network (e.g., a 4G/5G/6G/later versions of mobile networks) on various interfaces and protocols in NG-RAN environments and/or O-RAN environments are disclosed in accordance with some embodiments.

These and other embodiments and examples for applying context-based security over interfaces in NG-RAN environments and/or O-RAN environments in mobile networks will be further described below.

Example System Architectures for Applying Context-Based Security Over Interfaces in NG-RAN Environments in Mobile Networks Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, GTP-U sessions (e.g., GTP-U traffic) over Xn-U interfaces between a source NG-RAN node and a target NG-RAN node to apply security on user plane traffic based on a policy (e.g., layer-7 security and/or other security policy enforcement) as further described below. As another example, the security platform can be configured to correlate the context information with the user plane traffic to deliver the context-based security capabilities for inter node traffic in NG-RAN based 5G networks.

FIG. 1 is a block diagram of an architecture of a 5G wireless network with a security platform for applying context-based security over interfaces in an NG-RAN environment in mobile networks in accordance with some embodiments. Specifically, FIG. 1 is an example 5G mobile network environment that includes a Security Platform 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for applying context-based security over interfaces in NG-RAN environments in mobile networks (e.g., 5G or later mobile networks) as further described below.

As shown, the 5G mobile network environment can also include 5G Radio Access Network (RAN) access (e.g., gNB) as shown at 104A and 104B, and/or other networks (not shown in FIG. 1) to facilitate data communications for subscribers (e.g., using User Equipment (UE), such as smart phones, laptops, computers (which may be in a fixed location), and/or other cellular enabled computing devices/equipment, such as IoT devices as shown at 106, or other network communication enabled devices) including over a Central Data Network (e.g., the Internet) 120 to access various applications, web services, content hosts, etc. and/or other networks. As shown in FIG. 1, each of the 5G network access mechanisms 104A and 104B are in communication (e.g., via an N3 interface) with 5G Mobile Core User Plane (UP) Function 114 and are in communication (e.g., via an N2 interface) with 5G Mobile Core Control Plane (CP) Function 112, which is in communication with a Central Data Network 120.

Referring to FIG. 1, network traffic communications are monitored using Security Platform 102. As shown, network traffic communications are monitored/filtered in the 5G network using Security Platform 102 (e.g., (virtual) devices/ appliances that each include a firewall (FW), a network sensor acting on behalf of the firewall, or another device/ component that can implement security policies using the disclosed techniques) configured to perform the disclosed techniques for applying context-based security over interfaces in an NG-RAN environment in mobile networks as similarly described above and as further described below.

Specifically, security platform 102 monitors Xn-C and Xn-U interfaces. In some embodiments, a security platform is configured to provide the following DPI capabilities: stateful inspection of XnAP traffic over such Xn-C interfaces and GTP-U traffic over such Xn-U interfaces. In an example implementation, the security platform is configured to provide DPI capabilities (e.g., including stateful inspection) of, for example, XnAP sessions (e.g., XnAP traffic) over Xn-C interfaces and GTP-U sessions (e.g., GTP-U traffic) over Xn-U interfaces between a source NG-RAN node and a target NG-RAN node to apply security on user plane traffic based on a policy (e.g., layer-7 security and/or other security policy enforcement) as further described below. As another example, the security platform can be configured to correlate the context information with the user plane traffic to deliver the context-based security capabilities for inter node traffic in NG-RAN environments in 5G networks (sec, e.g., 3GPP TS 38.423-v16.6.0 5G; NG-RAN; Xn Application (XnAP), Protocol which is available at https://www.ctsi.org/deliver/ etsi_ts/138400_138499/138423/16.06.00_60/ ts_138423v160600p.p df).

In an example implementation, the security platform is configured to inspect XnAP traffic over an Xn-C interface between a source NG-RAN node and target NG-RAN node to extract contextual information. The security platform can also inspect GTP-U traffic over an Xn-U interface between the source NG-RAN node and the target NG-RAN node to apply layer 7 security on user plane traffic. The security platform can correlate the context information with the user plane traffic to deliver the context-based security capabilities for inter node traffic in NG-RAN environments in 5G networks.

In some embodiments, the security platform is configured to provide the following DPI capabilities: stateful inspection of XnAP traffic over Xn-C interfaces and GTP-U traffic over Xn-U interfaces and to apply context-based security as described herein.

In addition, Security Platform 102 can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis.

Referring to FIG. 1, Security Platform 102 performs XnAP and GTP-U stateful inspection in this example 5G mobile network environment by parsing XnAP session traffic on the Xn-C interfaces and parsing GTP-U session traffic on the Xn-U interfaces, respectively, to extract certain information as will be further described below with respect to FIGS. 2A and 2B.

As will now be apparent, network traffic communications can be monitored/filtered using one or more security platforms for network traffic communications in various locations within the 5G network (e.g., 5G network or converged 5G network) to facilitate applying context-based security over interfaces in an NG-RAN environment in mobile networks.

FIGS. 2A and 2B are tables of the parameters that are extracted by the security platform from a handover request during setup of a GTP-U tunnel session in accordance with some embodiments. This message is sent by a source NG-RAN node to the target NG-RAN node to request the preparation of resources for a handover (e.g., direction: source NG-RAN node→target NG-RAN node).

In some embodiments, the security platform is configured to use the User Plane (UP) transport layer information extracted from the "HANDOVER REQUEST" message to set up GTP-U tunnel session. As shown in FIG. 2A, the "PDU Session Resources To Be Setup List" IE contains PDU session resource related information used at UE context transfer between NG-RAN nodes. It contains UpLink (UL) tunnel information per the PDU Session Resource. As also shown in FIG. 2A, "Masked IMEISV" information is also provided, and the security platform can extract the Type Allocation Code (TAC) to obtain a make and model of a 5G device. As shown in FIG. 2B, other information that can be extracted from the "PDU Session Resources To Be Setup List" IE includes "S-NSSAI" which indicates the S-NSSAI as defined in 3GPP TS 23.003 version 16.3.0 Release 16 (e.g., available at https://www.etsi.org/deliver/etsi_ts/ 123000_123099/123003/16.03.00_60/ ts_123003v160300p.p df), "UL NG-U UP TNL Information at UPF" which indicates the UPF endpoint of the NG-U transport bearer for delivery of UL PDUs, and "Source DL NG-U TNL Information" which indicates the possibility to keep the NG-U GTP-U tunnel termination point at the target NG-RAN node.

Figure 2C:
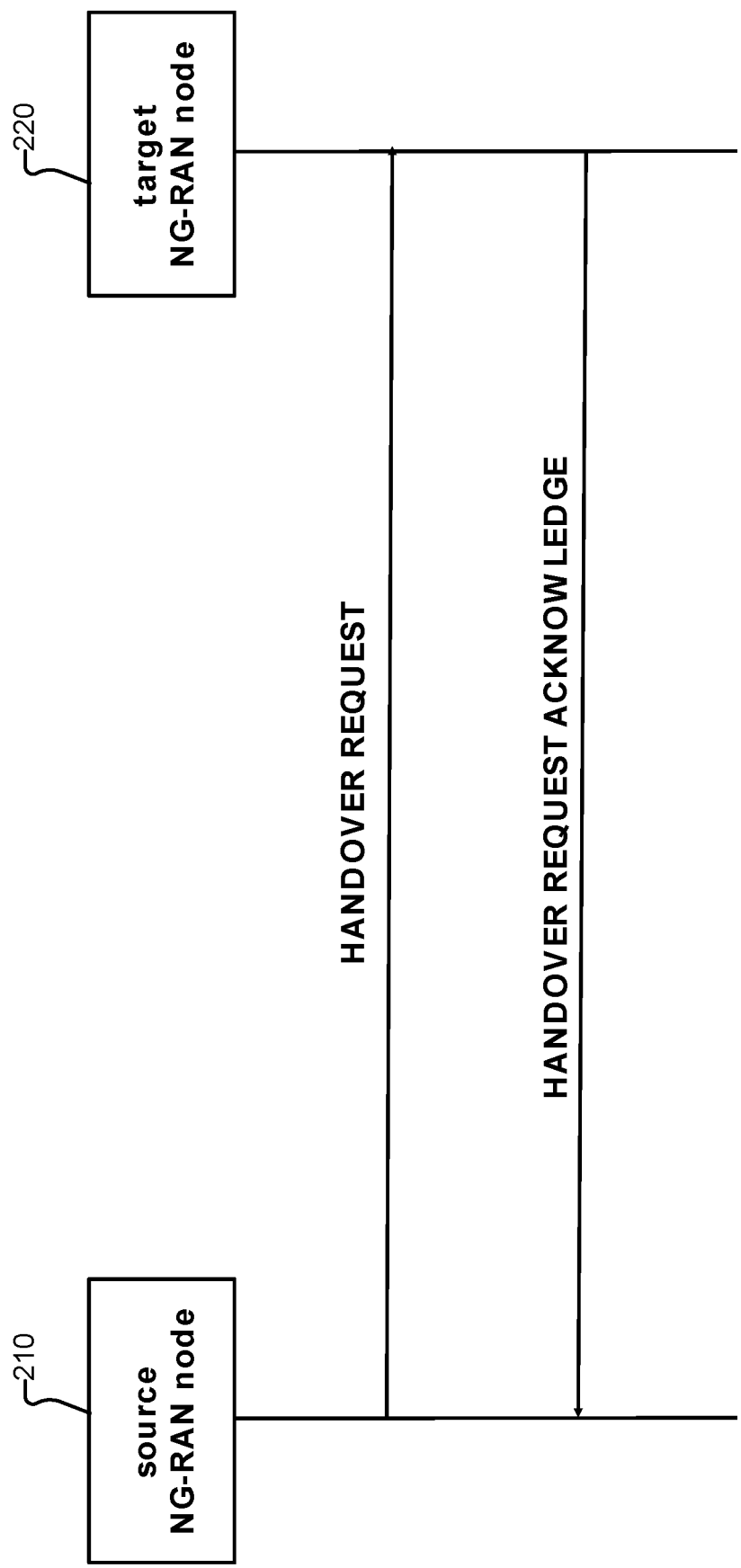
FIG. 2C is a handover protocol sequence diagram for an NG-RAN environment in mobile networks.

FIG. 2C is a handover protocol sequence diagram for an NG-RAN environment in mobile networks. As shown, a source NG-RAN node 210 sends a HANDOVER REQUEST message to a target NG-RAN node 220. The target NG-RAN node sends a response with a HANDOVER REQUEST ACKNOWLEDGE message as shown in FIG. 2C.

Example System Architectures for Applying Context-Based Security Over Interfaces in O-RAN Environments in Mobile Networks Generally, 5G is the 5th generation of the mobile communications system. The 3rd Generation Partnership Project (3GPP) includes seven telecommunications standard development organizations (i.e., ARIB, ATIS, CCSA, ETSI, TSDSI, TTA, and TTC). The project covers cellular telecommunications network technologies, including radio access, the core transport network, and service capabilities. The specifications also provide hooks for non-radio access to the core network, and for interworking with Wi-Fi networks and other organizations including ITU, IETF, and ETSI that are developing 5G standards. Some of the improvements of the new 5G network standards include, for example, an evolution of the Next Generation RAN (NG- RAN) architecture that is generally referred to as the Open Radio Access Network (O-RAN).

O-RAN (Open RAN) is a term used for industry-wide standards for RAN (Radio Access Network) interfaces that support interoperation between vendors' equipment and offer network flexibility at a lower cost. The main purpose of open RAN is to have an interoperability standard for RAN elements including non-proprietary white box hardware and software from different vendors. Network operators that opt for RAN elements with standard interfaces can avoid being locked into one vendor's proprietary hardware and software.

O-RAN ALLIANCE's mission is to re-shape the RAN industry towards more intelligent, open, virtualized, and fully interoperable mobile networks. The new O-RAN standards will enable a more competitive and vibrant RAN supplier ecosystem with faster innovation to improve user experience. O-RAN based mobile networks will at the same time improve the efficiency of RAN deployments as well as operations by the mobile operators.

O-RAN architecture is based on standards defined by O-RAN ALLIANCE, which are fully supporting and complimentary to standards promoted by 3GPP and other industry standards organizations. It includes interfaces defined and maintained by O-RAN including A1, O1, O2, E2 and Open Fronthaul interface. Moreover, this architecture also includes 3GPP interfaces including E1, F1-c, F1-u, NG-c, NG-u, X2-c, X2-u, X2-c, Xn-c, Xn-u, and Uu.

However, as similarly discussed above, this new O-RAN architecture opens up new threat vectors. As an example, the new O-RAN architecture in 5G networks opens up new security threats over the Xn-U interface. As such, various techniques for securing this new O-RAN environment in 5G networks are disclosed and will now be described further with respect to FIGS. 3-4B.

Figure 3:
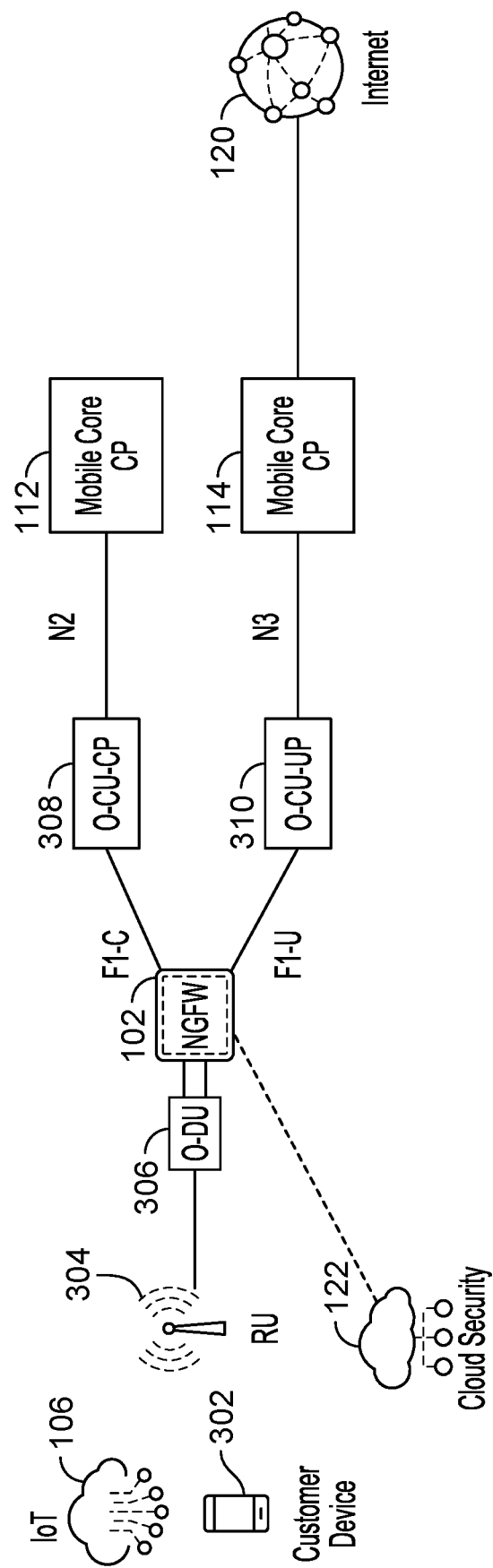
FIG. 3 is a block diagram of an architecture of a 5G wireless network with a security platform for applying context-based security over interfaces in an O-RAN environment in mobile networks in accordance with some embodiments.

FIG. 3 is a block diagram of an architecture of a 5G wireless network with a security platform for applying context-based security over interfaces in an O-RAN environment in mobile networks in accordance with some embodiments. Specifically, FIG. 3 is an example 5G mobile network environment that includes a Security Platform 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for applying context-based security over interfaces in O-RAN environments in mobile networks (e.g., 5G or later mobile networks) as further described below.

As shown, the 5G mobile network environment can also include a 5G Radio Unit (RU) (e.g., a radio hardware unit that converts radio signals to and from the antenna into a digital signal) as shown at 304, and/or other networks (not shown in FIG. 3) to facilitate data communications for subscribers (e.g., using User Equipment (UE), such as smart phones, laptops, computers (which may be in a fixed location), and/or other cellular enabled computing devices/equipment, such as IoT devices as shown at 106, or other network communication enabled devices) including over a Central Data Network (e.g., the Internet) 120 to access various applications, web services, content hosts, etc. and/or other networks. As shown in FIG. 3, the 5G network access mechanism, RU 304, is in communication with an O-RAN Distributed Unit (O-DU) 306 to facilitate network communications for UE, such as customer device 302 (e.g., a device capable of network/radio communications, such as a smart phone or another device capable of network/radio communications). O-DU 306 is in communication (e.g., via an F1-C interface) with O-RAN Centralized Unit Control Plane (O-CU-CP) 308 and is also in communication (e.g., via an F1-U interface) with O-RAN Centralized Unit User Plane (O-CU-UP) 310. O-CU-CP 308 is in communication (e.g., via an N2 interface) with 5G Mobile Core Control Plane (CP) Function 112. O-CU-UP 310 is in communication (e.g., via an N3 interface) with 5G Mobile Core User Plane (UP) Function 114, which is in communication with Internet 120.

Referring to FIG. 3, network traffic communications are monitored using Security Platform 102. As shown, network traffic communications are monitored/filtered in the 5G network using Security Platform 102 (e.g., (virtual) devices/appliances that each include a firewall (FW), a network sensor acting on behalf of the firewall, or another device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to perform the disclosed techniques for applying context-based security over interfaces in an O-RAN environment in mobile networks as similarly described above and as further described below.

Specifically, security platform 102 monitors F1-C and F1-U interfaces. In some embodiments, a security platform is configured to provide the following DPI capabilities: stateful inspection of F1AP traffic over such F1-C interfaces and GTP-U traffic over such F1-U interfaces. In an example implementation, the security platform is configured to provide DPI capabilities (e.g., including stateful inspection) of, for example, F1AP sessions (e.g., F1AP traffic) over F1-C interfaces between O-DU and O-CU-CP and GTP-U sessions (e.g., GTP-U traffic) over F1-U interfaces between O-DU and O-CU-UP to apply security on user plane traffic based on a policy (e.g., layer-7 security and/or other security policy enforcement) as further described below. As another example, the security platform can be configured to correlate the context information with the user plane traffic to deliver the context-based security capabilities for inter node traffic in O-RAN environments in 5G networks.

In an example implementation, the security platform is configured to use UP transport layer information extracted from the "UE CONTEXT SETUP REQUEST" and "UE CONTEXT SETUP RESPONSE" messages exchanged between gNB-DU and gNB-CU during the "UE Context Setup Procedure" to set up a GTP-U tunnel session. The UP Transport Layer Information IE identifies an F1 transport bearer associated to a DRB. It contains a Transport Layer Address and a GTP Tunnel Endpoint Identifier. The Transport Layer Address is an IP address to be used for the F1 user plane transport. The GTP Tunnel Endpoint Identifier is to be used for the user plane transport between gNB-CU and gNB-DU.

In addition, in this example implementation, the security platform is configured to inspect F1AP traffic over an F1-C interface between O-DU and O-CU-CP to extract contextual information. The security platform can also inspect GTP-U traffic over an F1-U interface between O-DU and O-CU-UP to apply layer-7 security on User Plane (UP) traffic (e.g., see 3GPP TS 38.473-V16.6.0, 5G; NG-RAN; F1 Application Protocol (F1AP) (3GPP TS 38.473 version 16.6.0 Release 16, which is available at https://www.etsi.org/deliver/etsi_ts/138400_138499/138473/16.06.00_60/ts_138473v160600p.p df); and see also 3GPP TS 38.470-V16.50, 5G, NG-RAN, F1 general aspects and principles (3GPP TS 38.470 version which 16.50, is available at https://www.etsi.org/deliver/etsi_ts/138400_138499/138470/16.05.00_60/ts_138470v160500p.p df)). The security platform can correlate the context information with the user plane traffic to deliver the context-based security capabilities in O-RAN based mobile networks (e.g., 5G networks).

In some embodiments, the security platform is configured to provide the following DPI capabilities: stateful inspection of F1AP traffic over F1-C interfaces between O-DU and O-CU-CP to extract contextual information and to apply context-based security as described herein.

In addition, Security Platform 102 can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis.

Referring to FIG. 3, Security Platform 102 performs F1AP and GTP-U stateful inspection in this example 5G mobile network environment by parsing F1AP session traffic on the F1-C interfaces and parsing GTP-U session traffic on the F1-U interfaces, respectively, to extract certain information as will be further described below with respect to FIGS. 4A and 4B.

As will now be apparent, network traffic communications can be monitored/filtered using one or more security platforms for network traffic communications in various locations within the mobile network (e.g., 5G network or converged 5G network) to facilitate applying context-based security over interfaces in O-RAN (e.g., including distributed O-RAN environments) in mobile networks.

FIGS. 4A and 4B are tables of the parameters that are extracted by the security platform from a handover request during setup of a GTP-U tunnel session in accordance with some embodiments.

In some embodiments, the security platform is configured to use the User Plane (UP) transport layer information extracted from the "UE CONTEXT SETUP REQUEST" and "UE CONTEXT SETUP RESPONSE" messages to set up the GTP-U tunnel session. The UP Transport Layer Information IE identifies an F1 transport bearer associated to a DRB. It contains a Transport Layer Address and a GTP Tunnel Endpoint Identifier. The Transport Layer Address is an IP address to be used for the F1 user plane transport. The GTP Tunnel Endpoint Identifier is to be used for the user plane transport between gNB-CU and gNB-DU.

As also shown in FIG. 4A, "Masked IMEISV" information is also provided, and the security platform can extract the Type Allocation Code (TAC) to obtain a make and model of a 5G device. As shown in FIG. 4A, other information that can be extracted from the "UE CONTEXT SETUP REQUEST" includes "S-NSSAI" which indicates the S-NSSAI as defined in 3GPP TS 23.003 version 16.3.0 Release 16 (e.g., available at https://www.etsi.org/deliver/etsi_ts/123000_123099/123003/16.03.00_60/ts_123003v160300p.p df), "UL NG-U UP TNL Information at UPF" which indicates the UPF endpoint of the NG-U transport bearer for delivery of UL PDUs, and "UL UP TNL Information" which indicates the gNB-CU endpoint of the F1 transport bearer for delivery of UL PDUs. As shown in FIG. 4B, other information that can be extracted from the "UE CONTEXT SETUP RESPONSE" (e.g., this message is sent by the gNB-DU to confirm the setup of a UE context, gNB-DU→gNB-CU) includes "DL UP TNL Information" which indicates the gNB-DU endpoint of the F1 transport bearer for delivery of DL PDUs.

Figure 4C:
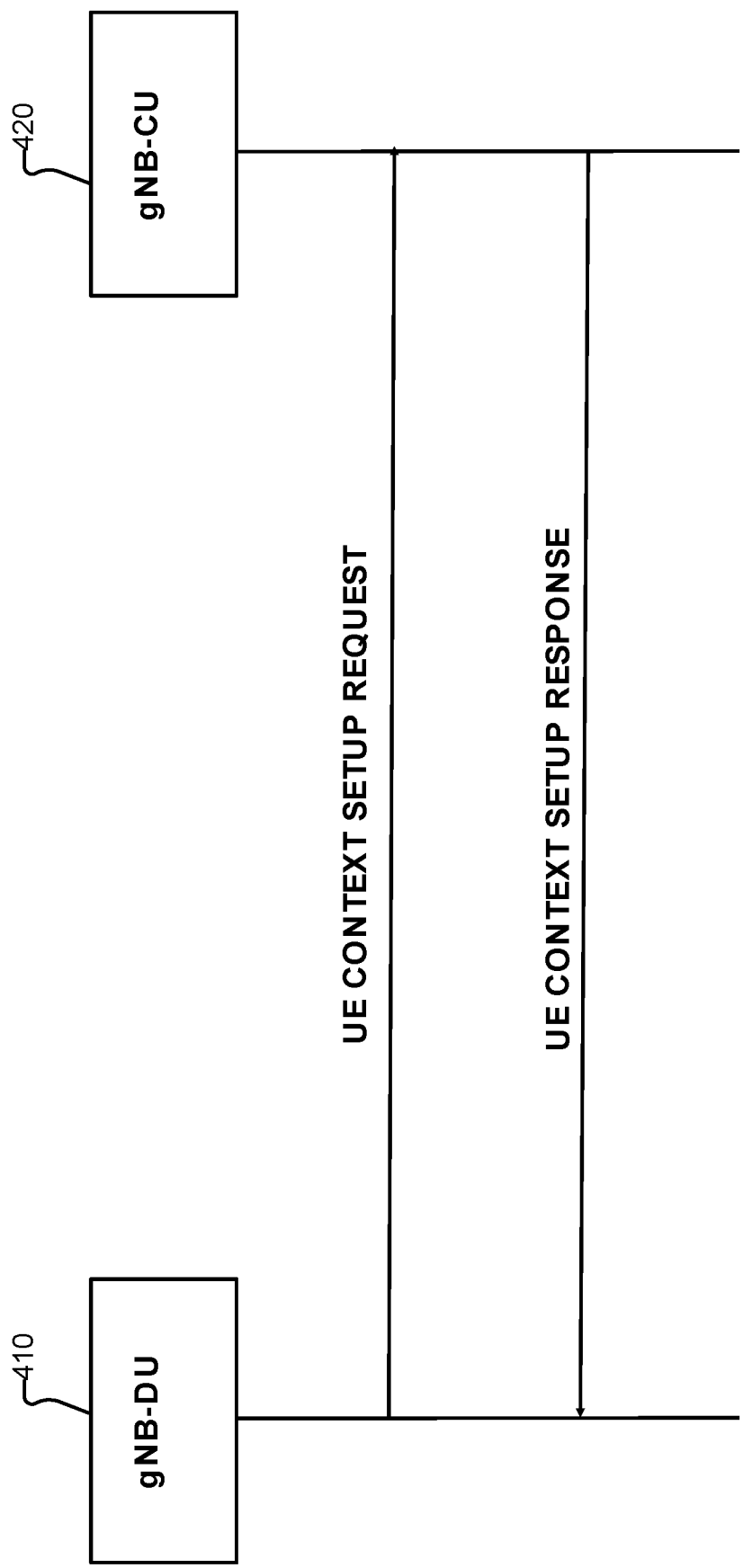
FIG. 4C is a handover protocol sequence diagram for an O-RAN environment in mobile networks.

FIG. 4C is a handover protocol sequence diagram for an O-RAN environment in mobile networks. As shown, a gNB-DU node 410 sends a UE CONTEXT SETUP REQUEST message to a gNB-CU node 420. The gNB-CU node sends a response with a UE CONTEXT SETUP RESPONSE message as shown in FIG. 4C.

Example Use Cases of Enhanced Security for Applying Context-Based Security Over Interfaces in NG-RAN and O-RAN Environments in Mobile Networks The disclosed techniques for providing enhanced security for mobile/service provider networks using a security platform for security policy enforcement, including for applying context-based security over interfaces in NG-RAN and/or O-RAN environments in mobile networks (e.g., including distributed O-RAN environments), can be applied in a variety of additional example use case scenarios for facilitating enhanced security for NG-RAN and/or O-RAN environments in mobile networks (e.g., 4G/5G/6G and later mobile networks) as will now be described with respect to various example use cases.

As a first example use case, the disclosed techniques can be used to facilitate context-based security over an interface in an NG-RAN environment in mobile networks (e.g., including context-based security over Xn-C and Xn-U interfaces in an NG-RAN environment in 5G networks) and/or in an O-RAN environment in mobile networks (e.g., including context-based security over F1-C and F1-U interfaces in an O-RAN environment in 5G networks).

As a second example use case, the disclosed techniques can be used to facilitate known and unknown threat identification over an interface in an NG-RAN environment in mobile networks (e.g., including known and unknown threat identification over Xn-C and Xn-U interfaces in an NG-RAN environment in 5G networks) and/or in an O-RAN environment in mobile networks (e.g., including known and unknown threat identification over F1-C and F1-U interfaces in an F1-RAN environment in 5G networks).

As a third example use case, the disclosed techniques can be used to facilitate an investigation of a security event related to a user equipment (UE) (e.g., self-driving cars, industrial IoT, etc.) exchanging user traffic over an interface (e.g., Xn-C and/or Xn-U interfaces in an NG-RAN environment or F1-C and/or F1-U interfaces in an O-RAN environment). For example, Scada systems infected with vulnerabilities related to Remote Code Execution (RCE) or remote information retrieval can be detected using the disclosed techniques.

Example vulnerabilities applicable to the above-described, for example, second and third example use cases are listed below.

(1) Delta Industrial Automation DIAEnergie HandlerAlarmGroup.aspx SQL Injection Vulnerability CVE-2021-38393.
(2) Delta Industrial Automation CNCSoft ScreenEditor DPB Element Section Stack Buffer Overflow Vulnerability CVE-2021-2267.
(3) Advantech WebAccess SCADA bwrunmie.exe Policy Bypass Vulnerability CVE-2019-13552.
(4) Advantech WebAccess/SCADA Memory Corruption Vulnerability CVE-2019-10991.
(5) Advantech WebAccess SCADA bwrunrpt.exe Stack-based Buffer Overflow Vulnerability CVE-2019-13556.
(6) GE Industrial Solutions Remote Command Execution Vulnerability CVE-2016-0861.

As a fourth example use case, the disclosed techniques can be used to facilitate advanced L7 security control for user traffic exchanged over an interface (e.g., Xn-C and/or Xn-U interfaces in an NG-RAN environment or F1-C and/or F1-U interfaces in an O-RAN environment). For example, detecting and blocking Command and Control (C&C) traffic (e.g., IoT spyware C&C traffic and/or IoT malware C&C traffic) between industrial machines when one machine is compromised/infected with C&C malware can be performed using the disclosed techniques.

As a fifth example use case, the disclosed techniques can be used to facilitate application (e.g., application layer) control over an interface (e.g., Xn-C and/or Xn-U interfaces in an NG-RAN environment or F1-C and/or F1-U interfaces in an O-RAN environment). As examples, the following security solutions can be effectively and efficiently implemented using the disclosed techniques: (a) allow only trusted applications and protocols (e.g., modbus) for industrial robots/machines connected to a separate 5G base station (gNB) in a smart factory; (b) allow only selected functions (e.g., modbus read write register, modbus read coils, modbus input registers, etc.) over trusted protocols for industrial robots/machines; and (c) block untrusted applications for industrial robots/machines connected to a separate 5G base station (gNB) in a smart factory.

As a sixth example use case, the disclosed techniques can be used to facilitate URL filtering over an interface in an O-RAN environment (e.g., including URL filtering over Xn-C and Xn-U interfaces in an O-RAN environment in 5G networks).

As a seventh example use case, the security platform can be configured with a security policy to perform detection and prevention of Denial of Service (DOS) attacks for applying context-based security over interfaces in an O-RAN environment in mobile networks.

As an eighth example use case, the disclosed techniques can be applied to improve energy efficiency in 5G networks (e.g., O-RAN environments and/or distributed O-RAN environments). Specifically, 5G devices' energy efficiency can be derailed by various types of malware attacks. For example, cryptocurrency mining is an example of an attack (e.g., a device can be compromised to be used for processing power for a cryptocurrency mining operation using distributed computing resources, including compromised 5G devices). As such, the disclosed techniques can facilitate detection and prevention of these malware attacks/threats that would otherwise derail energy efficiency of such 5G devices.

As a ninth example use case, the disclosed techniques can be applied to improve the security of various new 5G sensors. For example, connected cows in a 5G network in which dairy herds wear mobile connected sensors that collect biometric information on the cows' body temperature, pulse, and daily movements to let them graze further and better manage milk production, but such 5G sensors can also be compromised by malware. As such, the disclosed techniques can facilitate detection and prevention of these malware attacks/threats including malware, remote code execution.

Example vulnerabilities applicable to the above-described, for example, third, fourth, eighth, and ninth example use cases are listed below.
(1) Damstra Smart Asset SQL Injection Vulnerability CVE-2020-26525.
(2) CHIYU IoT Devices XSS Vulnerability CVE-2021-31250.
(3) InduSoft Web Studio and InTouch Machine Edition Remote Code Execution Vulnerability CVE-2018-10620.
(4) Ecava IntegraXor Human-Machine Interface Stack-based Buffer Overflow Vulnerability CVE-2010-4597.

As will now be apparent to one of ordinary skill in the art, the disclosed techniques for applying context-based security over interfaces in NG-RAN and/or O-RAN environments in mobile networks using a security platform for security policy enforcement can be applied in a variety of additional example use case scenarios to detect/prevent these and other types of attacks for facilitating enhanced security for O-RAN/NG-RAN environments in mobile networks.

Figure 5:
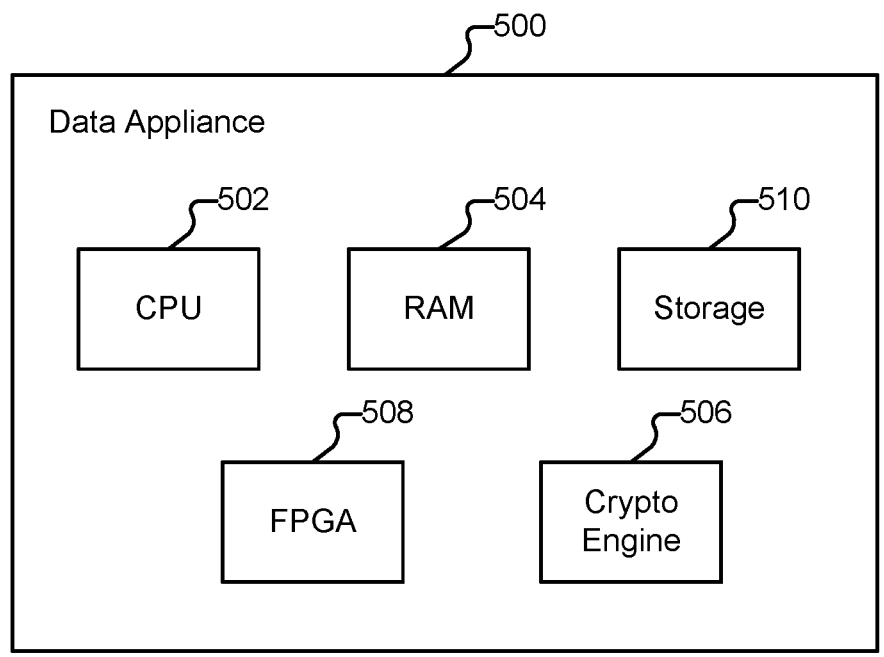
FIG. 5 is a functional diagram of hardware components of a network device for applying context-based security over interfaces in NG-RAN environments and/or O-RAN environments in mobile networks in accordance with some embodiments.

Example Hardware Components of a Network Device for Applying Context-Based Security Over Interfaces in NG-RAN and/or O-RAN Environments in Mobile Networks FIG. 5 is a functional diagram of hardware components of a network device for applying context-based security over interfaces in NG-RAN environments and/or O-RAN environments in mobile networks in accordance with some embodiments. The example shown is a representation of physical/hardware components that can be included in network device 500 (e.g., an appliance, gateway, or server that can implement the security platform disclosed herein). Specifically, network device 500 includes a high performance multi-core CPU 502 and RAM 504. Network device 500 also includes a storage 510 (e.g., one or more hard disks or solid state storage units), which can be used to store policy and other configuration information as well as signatures. In one embodiment, storage 510 stores certain information (e.g., XnAP traffic information and/or GTP-U traffic information as similarly described above) that is extracted from monitored traffic over various interfaces (e.g., XnAP traffic over Xn-C interfaces and GTP-U traffic over Xn-U interfaces) that are monitored for implementing the disclosed security policy enforcement techniques for applying context-based security over interfaces in an O-RAN environment in mobile networks using a security platform(s) as similarly described above with respect to FIGS. 1-4B. Network device 500 can also include one or more optional hardware accelerators. For example, network device 500 can include a cryptographic engine 506 configured to perform encryption and decryption operations, and one or more FPGAs 508 configured to perform signature matching, act as network processors, and/or perform other tasks.

Figure 6:
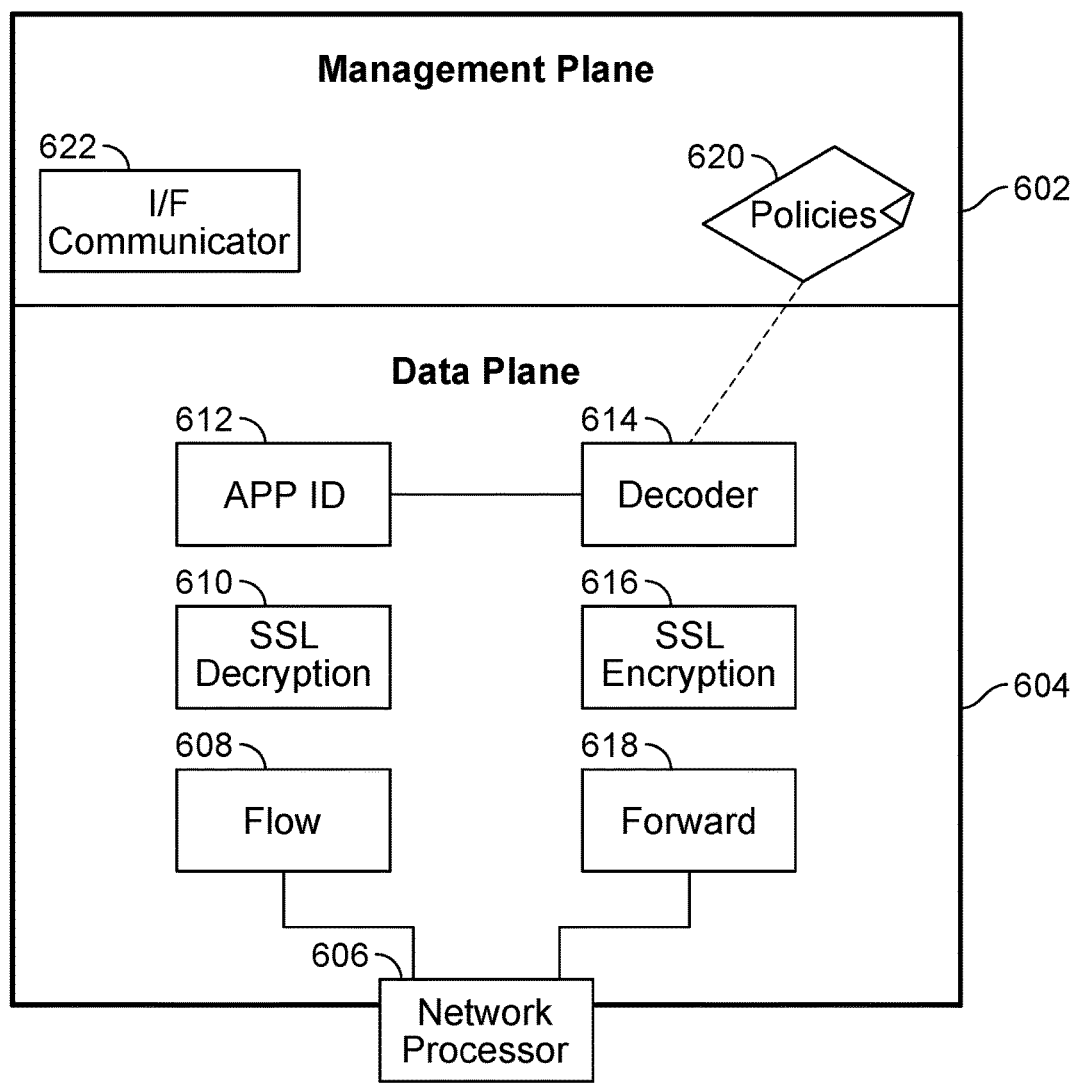
FIG. 6 is a functional diagram of logical components of a network device for applying context-based security over interfaces in NG-RAN environments and/or O-RAN environments in mobile networks in accordance with some embodiments.

Example Logical Components of a Network Device for Applying Context-Based Security Over Interfaces in an O-RAN Environment in Mobile Networks FIG. 6 is a functional diagram of logical components of a network device for applying context-based security over interfaces in NG-RAN environments and/or O-RAN environments in mobile networks in accordance with some embodiments. The example shown is a representation of logical components that can be included in network device 600 (e.g., a data appliance, which can implement the disclosed security function/platform and perform the disclosed techniques for applying context-based security over interfaces in an O-RAN environment in mobile networks). As shown, network device 600 includes a management plane 602 and a data plane 604. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, an MEC service, an IoT device, or another resource) using an encrypted session protocol, such as SSL. Network processor 606 is configured to monitor packets from the mobile device and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decryption engine 610 using various techniques as described herein. Otherwise, processing by SSL decryption engine 610 is omitted. Application identification (APP ID) module 612 is configured to determine what type of traffic the session involves (e.g., PFCP over UDP traffic between various monitored interfaces as similarly described above with respect to FIGS. 1-4B) and to identify a user associated with the traffic flow (e.g., to identify an Application-ID as described herein). For example, APP ID 612 can recognize a GET request in the received data and conclude that the session requires an HTTP decoder 614. As another example, APP ID 612 can recognize a GTP-U session establishment/modification/release messages (e.g., over Xn-C and Xn-U interfaces, such as similarly described above with respect to FIGS. 1-4B) and conclude that the session requires a GTP-U decoder (e.g., to extract information exchanged in the GTP-U traffic session over Xn-C and Xn-U interfaces including various parameters, such as similarly described above with respect to FIGS. 1-4B). For each type of protocol, there exists a corresponding decoder 614. In one embodiment, the application identification is performed by an application identification module (e.g., APP ID component/engine), and a user identification is performed by another component/engine. Based on the determination made by APP ID 612, the packets are sent to an appropriate decoder 614. Decoder 614 is configured to assemble packets (e.g., which may be received out of order) into the correct order, perform tokenization, and extract out information (e.g., such as to extract various information exchanged in GTP-U traffic over Xn-C/Xn-U/other interfaces as similarly described above and further described below). Decoder 614 also performs signature matching to determine what should happen to the packet. SSL encryption engine 616 performs SSL encryption using various techniques as described herein and the packets are then forwarded using a forward component 618 as shown. As also shown, policies 620 are received and stored in the management plane 602. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored GTP-U traffic and/or DPI of monitored GTP-U and/or other protocol(s) traffic, such as XnAP traffic over Xn-C interfaces, as disclosed herein) is applied as described herein with respect to various embodiments based on the monitored, decrypted, identified, and decoded session traffic flows.

As also shown in FIG. 6, an interface (I/F) communicator 622 is also provided for security platform manager communications (e.g., via (REST) APIs, messages, or network protocol communications or other communication mechanisms). In some cases, network communications of other network elements on the service provider network are monitored using network device 600, and data plane 604 supports decoding of such communications (e.g., network device 600, including I/F communicator 622 and decoder 614, can be configured to monitor and/or communicate on, for example, reference point interfaces such as Xn-C, Xn-U, and/or other interfaces where wired and wireless network traffic flow exists). As such, network device 600 including I/F communicator 622 can be used to implement the disclosed techniques for security policy enforcement on mobile/service provider network environments, including MEC services security, as described above and as will be further described below.

Additional example processes for the disclosed techniques for applying context-based security over interfaces in NG-RAN and/or O-RAN environments in mobile networks will now be described.

Figure 7:
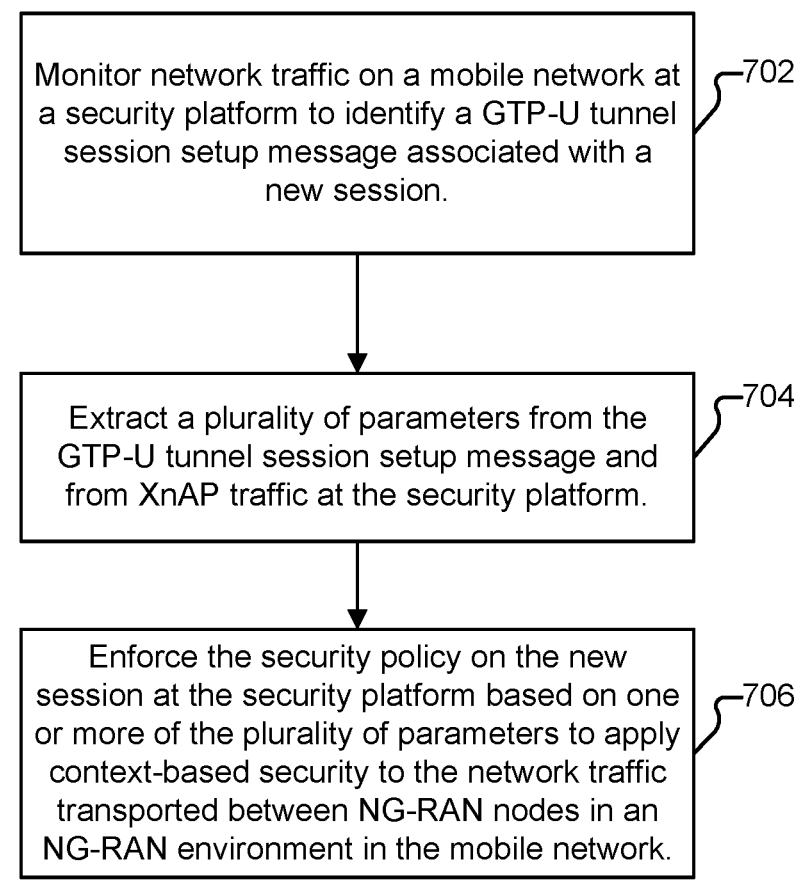
FIG. 7 is a flow diagram of a process for applying context-based security over interfaces in NG-RAN environments in mobile networks in accordance with some embodiments.

Example Processes for Applying Context-Based Security Over Interfaces in NG-RAN Environments in Mobile Networks FIG. 7 is a flow diagram of a process for applying context-based security over interfaces in NG-RAN environments in mobile networks in accordance with some embodiments. In some embodiments, a process 700 as shown in FIG. 7 is performed by the security platform and techniques as similarly described above including the embodiments described above with respect to FIGS. 1-2B, 5, and 6. In one embodiment, process 700 is performed by data appliance 500 as described above with respect to FIG. 5, network device 600 as described above with respect to FIG. 6, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 702, monitoring network traffic on a mobile network at a security platform to identify a GTP-U tunnel session setup message associated with a new session is performed. For example, the security platform (e.g., a firewall, a network sensor acting on behalf of the firewall, or another device/component that can implement security policies) can monitor, in some cases, various protocols, such as GTP-U (e.g., over Xn-U interface), XnAP (e.g., over Xn-C interface), and/or other protocols, on the mobile network and, more specifically, by performing the disclosed techniques can monitor various interfaces, such as the Xn-C and Xn-U interfaces, as similarly described above.

In some embodiments, the security platform inspects XnAP traffic over an Xn-C interface between a source NG-RAN node and a target NG-RAN node to extract contextual information (e.g., and can store the contextual information locally in the security platform or in a cloud-based storage).

In some embodiments, the security platform inspects GTP-U traffic over an Xn-U interface between a source NG-RAN node and a target NG-RAN node to apply Layer-7 security on user plane traffic.

At 704, extracting a plurality of parameters from the GTP-U tunnel session setup message and from XnAP traffic to extract contextual information at the security platform is performed. For example, the parameters as similarly described above with respect to FIGS. 2A and 2B can be extracted.

In some embodiments, the security platform correlates the context information with the user plane traffic to perform context-based security for inter node traffic in the NG-RAN environment.

At 706, enforcing a security policy at the security platform on the new session based on one or more of the plurality of parameters to apply context-based security to the network traffic transported between NG-RAN nodes in an NG-RAN environment in the mobile network is performed. For example, security policy enforcement can include allowing or blocking the session.

In some embodiments, the security platform performs context-based security over an Xn-U interface in the NG-RAN environment. Other examples of security policy enforcement include the following: (1) detection and prevention of known and unknown threat identification and prevention over an Xn-U interface in the NG-RAN environment; (2) application identification and control over an Xn-U interface in the NG-RAN environment; and (3) URL filtering over an Xn-U interface in the NG-RAN environment.

Figure 8:
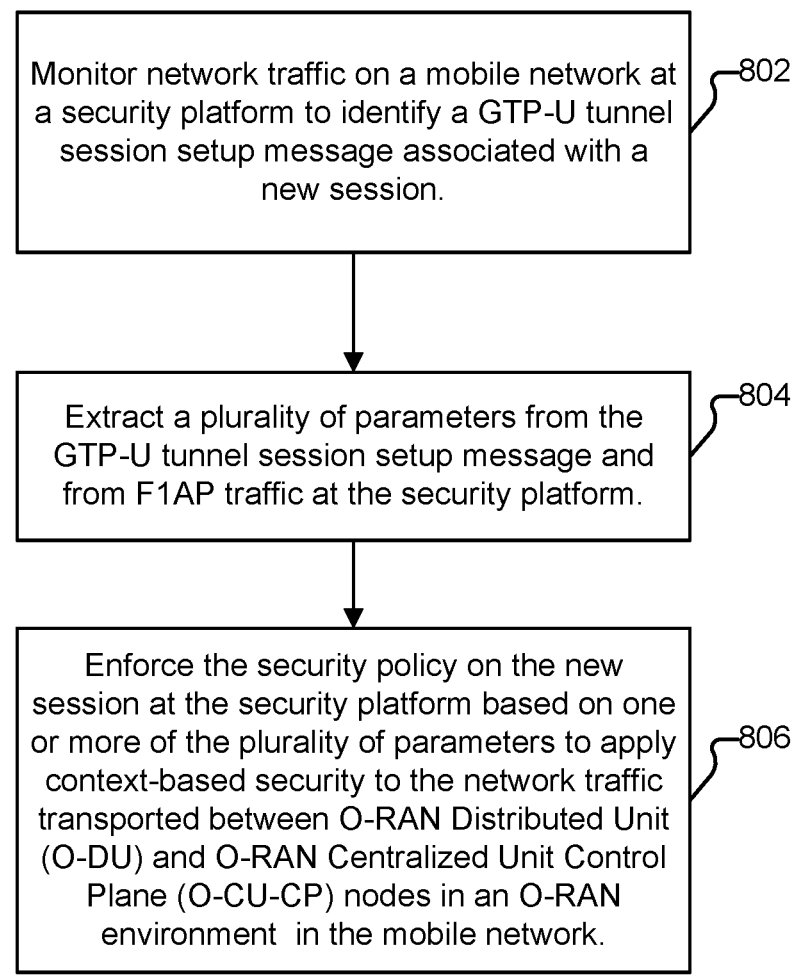
FIG. 8 is a flow diagram of a process for applying context-based security over interfaces in O-RAN environments in mobile networks in accordance with some embodiments.

Example Processes for Applying Context-Based Security Over Interfaces in NG-RAN Environments in Mobile Networks FIG. 8 is a flow diagram of a process for applying context-based security over interfaces in O-RAN environments in mobile networks in accordance with some embodiments. In some embodiments, a process 800 as shown in FIG. 8 is performed by the security platform and techniques as similarly described above including the embodiments described above with respect to FIGS. 3-4B, 5, and 6. In one embodiment, process 800 is performed by data appliance 500 as described above with respect to FIG. 5, network device 600 as described above with respect to FIG. 6, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

The process begins at 802. At 802, monitoring network traffic on a mobile network at a security platform to identify a GTP-U tunnel session setup message associated with a new session is performed. For example, the security platform (e.g., a firewall, a network sensor acting on behalf of the firewall, or another device/component that can implement security policies) can monitor, in some cases, various protocols, such as GTP-U (e.g., over F1-U interface), F1AP (e.g., over F1-C interface), and/or other protocols, on the mobile network and, more specifically, by performing the disclosed techniques can monitor various interfaces, such as the F1-C and F1-U interfaces, as similarly described above.

In some embodiments, the security platform inspects F1AP traffic over an F1-C interface between an O-DU node and an O-CU-CP node to extract contextual information (e.g., and can store the contextual information locally in the security platform or in a cloud-based storage).

In some embodiments, the security platform inspects GTP-U traffic over an F1-U interface between a gNB-DU node and a gNB-CU node to apply Layer-7 security on user plane traffic.

At 804, extracting a plurality of parameters from the GTP-U tunnel session setup message and from FLAP traffic at the security platform is performed. For example, the parameters as similarly described above with respect to FIGS. 4A and 4B can be extracted.

In some embodiments, the security platform correlates the context information with the user plane traffic to perform context-based security for inter node traffic in the O-RAN environment.

At 806, enforcing a security policy at the security platform on the new session based on one or more of the plurality of parameters to apply context-based security to the network traffic transported between O-RAN Distributed Unit (O-DU) and O-RAN Centralized Unit Control Plane (O-CU-CP) nodes in an O-RAN environment in the mobile network is performed. For example, security policy enforcement can include allowing or blocking the session.

In some embodiments, the security platform performs context-based security over an F1-U interface in the O-RAN environment. Other examples of security policy enforcement include the following: (1) detection and prevention of known and unknown threat identification and prevention over an F1-U interface in the O-RAN environment; (2) application identification and control over an F1-U interface in the O-RAN environment; and (3) URL filtering over an F1-U interface in the O-RAN environment.

As will now be apparent in view of the disclosed embodiments, a network service provider/mobile operator (e.g., a cellular service provider entity), a device manufacturer (e.g., an automobile entity, IoT device entity, and/or other device manufacturer), and/or system integrators can specify such security policies that can be enforced by a security platform using the disclosed techniques to solve these and other technical network security challenges for applying context-based security in NG-RAN environments and O-RAN environments (e.g., including distributed O-RAN environments) in mobile networks, including 4G networks, 5G networks, 6G networks, and/or later generations of mobile networks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        monitor network traffic on a mobile network at a security platform to identify a GTP-U tunnel session setup message associated with a new session;
        extract a plurality of parameters from the GTP-U tunnel session setup message and from XnAP traffic to extract contextual information at the security platform, wherein extracting a plurality of parameters from the GTP-U tunnel session setup message and from XnAP traffic to extract contextual information at the security platform further comprises:
            inspect XnAP traffic over an Xn-C interface between NG-RAN nodes in an NG-RAN environment in the mobile network to extract contextual information, comprising to:

inspect the XnAP traffic over an Xn-C interface between a source NG-RAN node and a target NG-RAN node to extract the contextual information; and store the contextual information locally in the security platform or in a cloud-based storage; and enforce a security policy at the security platform on the new session based on one or more of the plurality of parameters to apply context-based security to the network traffic transported between NG-RAN nodes in an NG-RAN environment in the mobile network, comprising to:

allow the new session to access a first resource and/or block the new session from accessing a second resource based on the security policy; and a memory coupled to the processor and configured to provide the processor with instructions.

2. The system recited in claim 1, wherein the security platform extracts User Plane (UP) transport layer information extracted from a handover request message to setup the GTP-U tunnel session.

3. The system recited in claim 1, wherein the security platform is configured with a plurality of security policies to apply the context-based security to the network traffic transported between the NG-RAN nodes in the NG-RAN environment in the mobile network.

4. The system recited in claim 1, wherein the security platform is configured to perform context-based security over an Xn-U interface in the NG-RAN environment.

5. The system recited in claim 1, wherein the security platform is configured to perform detection and prevention of known and unknown threat identification and prevention over an Xn-U interface in the NG-RAN environment.

6. The system recited in claim 1, wherein the security platform is configured to perform application identification and control over an Xn-U interface in the NG-RAN environment.

7. The system recited in claim 1, wherein the security platform is configured to perform URL filtering over an Xn-U interface in the NG-RAN environment.

8. A system, comprising:
a processor configured to:
monitor network traffic on a mobile network at a security platform to identify a GTP-U tunnel session setup message associated with a new session;
extract a plurality of parameters from the GTP-U tunnel session setup message and from XnAP traffic to extract contextual information at the security platform, wherein extracting a plurality of parameters from the GTP-U tunnel session setup message and from XnAP traffic to extract contextual information at the security platform further comprises:
inspect XnAP traffic over an Xn-C interface between NG-RAN nodes in an NG-RAN environment in the mobile network to extract the contextual information;
inspect GTP-U traffic over an Xn-U interface between a source NG-RAN node and a target NG-RAN node to apply Layer-7 security on user plane traffic; and
correlate the contextual information with the user plane traffic to perform context-based security for inter node traffic in the NG-RAN environment;
enforce a security policy at the security platform on the new session based on one or more of the plurality of parameters to apply context-based security to the network traffic transported between NG-RAN nodes in an NG-RAN environment in the mobile network, comprising to:
allow the new session to access a first resource and/or block the new session from accessing a second resource based on the security policy; and
a memory coupled to the processor and configured to provide the processor with instructions.

9. A method, comprising:
monitoring network traffic on a mobile network at a security platform to identify a GTP-U tunnel session setup message associated with a new session;
extracting a plurality of parameters from the GTP-U tunnel session setup message and from XnAP traffic to extract contextual information at the security platform, wherein extracting a plurality of parameters from the GTP-U tunnel session setup message and from XnAP traffic to extract contextual information at the security platform further comprises:
inspecting XnAP traffic over an Xn-C interface between NG-RAN nodes in an NG-RAN environment in the mobile network to extract contextual information, comprising:
inspecting the XnAP traffic over an Xn-C interface between a source NG-RAN node and a target NG-RAN node to extract the contextual information; and
storing the contextual information locally in the security platform or in a cloud-based storage; and
enforcing a security policy at the security platform on the new session based on one or more of the plurality of parameters to apply context-based security to the network traffic transported between NG-RAN nodes in an NG-RAN environment in the mobile network, comprising:
allowing the new session to access a first resource and/or blocking the new session from accessing a second resource based on the security policy.

10. The method of claim 9, wherein the security platform extracts User Plane (UP) transport layer information extracted from a handover request message to set up the GTP-U tunnel session.

11. The method of claim 9, wherein the security platform is configured with a plurality of security policies to apply the context-based security to the network traffic transported between the NG-RAN nodes in the NG-RAN environment in the mobile network.

12. The method of claim 9, further comprising:
performing context-based security over an Xn-U interface in the NG-RAN environment.

13. A method, comprising:
monitoring network traffic on a mobile network at a security platform to identify a GTP-U tunnel session setup message associated with a new session;
extracting a plurality of parameters from the GTP-U tunnel session setup message and from XnAP traffic to extract contextual information at the security platform, wherein extracting a plurality of parameters from the GTP-U tunnel session setup message and from XnAP traffic to extract contextual information at the security platform further comprises:
inspecting XnAP traffic over an Xn-C interface between NG-RAN nodes in an NG-RAN environment in the mobile network to extract contextual information;

inspecting GTP-U traffic over an Xn-U interface between a source NG-RAN node and a target NG-RAN node to apply Layer-7 security on user plane traffic; and correlating the context information with the user plane traffic to perform context-based security for inter node traffic in the NG-RAN environment; and enforcing a security policy at the security platform on the new session based on one or more of the plurality of parameters to apply context-based security to the network traffic transported between NG-RAN nodes in an NG-RAN environment in the mobile network, comprising:

allowing the new session to access a first resource and/or blocking the new session from accessing a second resource based on the security policy.

14. A computer program product, the computer program product being embodied in a non-transitory computer readable storage medium and comprising computer instructions for:

monitoring network traffic on a mobile network at a security platform to identify a GTP-U tunnel session setup message associated with a new session;

extracting a plurality of parameters from the GTP-U tunnel session setup message and from XnAP traffic to extract contextual information at the security platform, wherein extracting a plurality of parameters from the GTP-U tunnel session setup message and from XnAP traffic to extract contextual information at the security platform further comprises:

inspecting XnAP traffic over an Xn-C interface between NG-RAN nodes in an NG-RAN environment in the mobile network to extract contextual information, comprising:

inspecting the XnAP traffic over an Xn-C interface between a source NG-RAN node and a target NG-RAN node to extract the contextual information; and storing the contextual information locally in the security platform or in a cloud-based storage; and enforcing a security policy at the security platform on the new session based on one or more of the plurality of parameters to apply context-based security to the network traffic transported between NG-RAN nodes in an NG-RAN environment in the mobile network, comprising:

allowing the new session to access a first resource and/or blocking the new session from accessing a second resource based on the security policy.

15. A computer program product, the computer program product being embodied in a non-transitory computer readable storage medium and comprising computer instructions for:

monitoring network traffic on a mobile network at a security platform to identify a GTP-U tunnel session setup message associated with a new session;

extracting a plurality of parameters from the GTP-U tunnel session setup message and from XnAP traffic to extract contextual information at the security platform, wherein extracting a plurality of parameters from the GTP-U tunnel session setup message and from XnAP traffic to extract contextual information at the security platform further comprises:

inspecting XnAP traffic over an Xn-C interface between NG-RAN nodes in an NG-RAN environment in the mobile network to extract contextual information;

inspecting GTP-U traffic over an Xn-U interface between a source NG-RAN node and a target NG-RAN node to apply Layer-7 security on user plane traffic; and correlating the context information with the user plane traffic to perform context-based security for inter node traffic in the NG-RAN environment; and enforcing a security policy at the security platform on the new session based on one or more of the plurality of parameters to apply context-based security to the network traffic transported between NG-RAN nodes in an NG-RAN environment in the mobile network, comprising:

allowing the new session to access a first resource and/or blocking the new session from accessing a second resource based on the security policy.

* * * * *